US009964784B2

(12) United States Patent
McBrien et al.

(10) Patent No.: US 9,964,784 B2
(45) Date of Patent: May 8, 2018

(54) MODULATOR WITH SIGNAL ELECTRODE ENCLOSED BY GROUND ELECTRODE

(71) Applicant: Lumentum Operations LLC, Milpitas, CA (US)

(72) Inventors: Gregory J. McBrien, Glastonbury, CT (US); Karl Kissa, Gilroy, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days. days.

(21) Appl. No.: 15/091,224

(22) Filed: Apr. 5, 2016

(65) Prior Publication Data

US 2016/0291353 A1   Oct. 6, 2016

Related U.S. Application Data

(60) Provisional application No. 62/143,427, filed on Apr. 6, 2015, provisional application No. 62/143,961, filed on Apr. 7, 2015.

(51) Int. Cl.
G02F 1/035 (2006.01)
G02F 1/01 (2006.01)
G02F 1/03 (2006.01)
G02F 1/225 (2006.01)

(52) U.S. Cl.
CPC .......... *G02F 1/0102* (2013.01); *G02F 1/0316* (2013.01); *G02F 1/0356* (2013.01); *G02F 1/2255* (2013.01)

(58) Field of Classification Search
CPC .............................. G02F 1/0316; G02F 1/0356
See application file for complete search history.

(56) References Cited

U.S. PATENT DOCUMENTS

| | | | |
|---|---|---|---|
| 5,129,017 A | * | 7/1992 | Kawano ............... G02F 1/2255 |
| | | | 385/2 |
| 5,138,480 A | | 8/1992 | Dolfi et al. |
| 5,404,412 A | | 4/1995 | Seino et al. |
| 5,455,876 A | | 10/1995 | Hopfer et al. |
| 5,473,711 A | | 12/1995 | Hakogi et al. |
| 5,497,445 A | | 3/1996 | Imoto |
| 5,502,780 A | | 3/1996 | Rangaraj |
| 5,563,965 A | | 10/1996 | Madabhushi |

(Continued)

OTHER PUBLICATIONS

Miyamoto et al., "Design of high efficiency LiNbO3 broadband phase modulator using an electrode buried in buffer layer," Electronics Letters, Jan. 30, 1992, vol. 28, No. 3, pp. 322-324.

(Continued)

*Primary Examiner* — Chris Chu
(74) *Attorney, Agent, or Firm* — Harrity & Harrity, LLP

(57) ABSTRACT

A modulator may include a substrate. The modulator may include one or more waveguides formed upon or formed in the substrate. A signal electrode may be provided adjacent to at least one of the one or more waveguides and may include a curved outer surface. The modulator may include one or more ground electrodes provided adjacent to the signal electrode. Each ground electrode, of the one or more ground electrodes, may include a respective curved inner surface that is radially spaced from the curved outer surface of the signal electrode. The one or more ground electrodes and the substrate may at least substantially enclose the curved outer surface of the signal electrode.

17 Claims, 8 Drawing Sheets

(56) References Cited

U.S. PATENT DOCUMENTS

| | | | |
|---|---|---|---|
| 5,598,490 A | 1/1997 | Hakogi et al. | |
| 5,680,497 A | 10/1997 | Seino et al. | |
| 5,764,822 A | 6/1998 | Madabhushi | |
| 5,787,211 A * | 7/1998 | Gopalakrishnan | G02F 1/0356 385/2 |
| 5,790,719 A | 8/1998 | Mitomi et al. | |
| 5,895,742 A | 4/1999 | Lin | |
| 6,069,729 A | 5/2000 | Gill et al. | |
| 6,198,855 B1 | 3/2001 | Hallemeier et al. | |
| 6,545,791 B1 | 4/2003 | McCaughan et al. | |
| 6,580,843 B2 | 6/2003 | Doi et al. | |
| 6,584,240 B2 | 6/2003 | Doi et al. | |
| 6,721,085 B2 * | 4/2004 | Sugiyama | G02F 1/2255 359/322 |
| 6,845,183 B2 | 1/2005 | Cheung et al. | |
| 7,171,063 B2 | 1/2007 | Feke et al. | |
| 7,231,101 B2 | 6/2007 | Nagata | |
| 7,426,326 B2 * | 9/2008 | Moeller | G02F 1/0356 385/40 |
| 2003/0228081 A1 * | 12/2003 | Tavlykaev | G02F 1/0316 385/3 |
| 2004/0067021 A1 * | 4/2004 | Miyama | G02F 1/0322 385/40 |
| 2011/0081107 A1 * | 4/2011 | Sugiyama | G02F 1/0356 385/2 |
| 2014/0294380 A1 * | 10/2014 | Sugiyama | G02B 6/14 398/28 |

OTHER PUBLICATIONS

Miyamoto et al., "Evaluation of LiNbO3 intensity modulator using electrodes buried in buffer layer," Electronics Letters, May 21, 1992, vol. 28, No. 11, pp. 976-977.

Noguchi et al., "Millimeter-wave TiLiNbO3 optical modulators," IEEE Journal of Lightwave Technology, vol. 16, No. 4, Apr. 1998, pp. 615-619.

Kawano, "High-speed shielded velocity-matched Ti:LiNbO3 optical modulator," IEEE Journal of Quantum Electronics, Sep. 1993, vol. 29, No. 9, pp. 2466-2475.

* cited by examiner

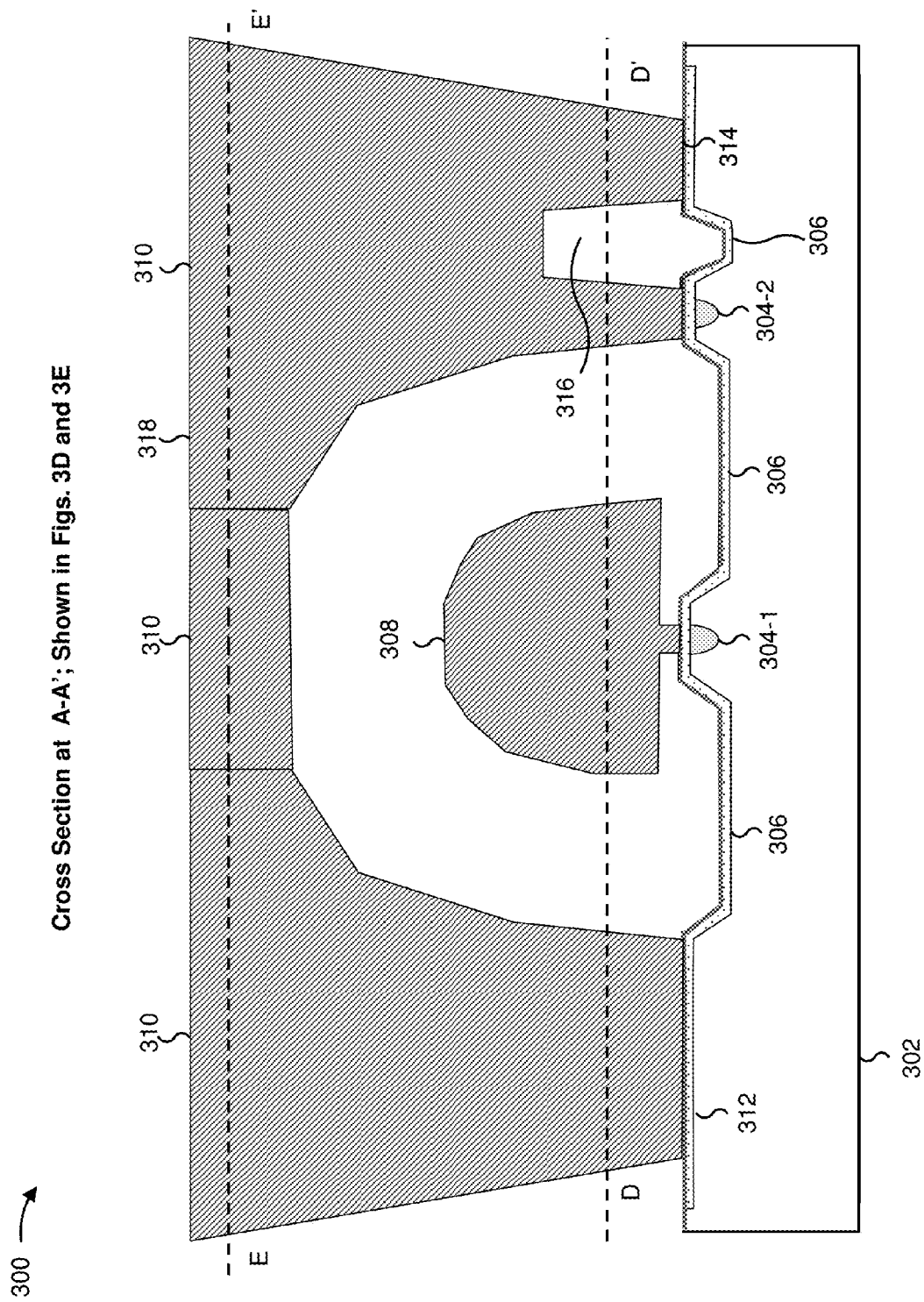

MODULATOR WITH SIGNAL ELECTRODE ENCLOSED BY GROUND ELECTRODE

RELATED APPLICATIONS

This application claims priority under 35 U.S.C. § 119 to U.S. Provisional Patent Application No. 62/143,427, filed Apr. 6, 2015, and U.S. Provisional Patent Application No. 62/143,961, filed Apr. 7, 2015, the contents of which are incorporated by reference herein in their entirety.

TECHNICAL FIELD

The present disclosure relates to optical communication technology. More particularly, the present disclosure relates to modulators for modulation of optical signals.

BACKGROUND

A modulator is a device that uses a modulation signal to modify a periodic waveform, called a carrier signal, to add information to the carrier signal. For example, a modulator may use an electrical current in a signal electrode to generate a radio frequency field, and the radio frequency field may modify the carrier signal to add information to the carrier signal. Modulators are sometimes used to convert an electrical signal into an optical signal in an optical network. In such a case, the modulation signal may be based on the electrical signal, and the optical signal may be used as the carrier signal.

SUMMARY

According to some possible implementations, a modulator may include a substrate. The modular may include one or more waveguides formed upon or formed in the substrate. A signal electrode may be provided adjacent to at least one of the one or more waveguides and may include a curved outer surface. The modulator may include one or more ground electrodes provided adjacent to the signal electrode. Each ground electrode, of the one or more ground electrodes, may include a respective curved inner surface that is radially spaced from the curved outer surface of the signal electrode. The one or more ground electrodes and the substrate may at least substantially enclose the curved outer surface of the signal electrode.

According to some possible implementations, a device may include a substrate. The device may include one or more waveguides formed upon or formed in the substrate. The device may include a signal electrode including an outer surface. The device may include a ground electrode including an inner surface that is radially spaced from the outer surface of the signal electrode. A gap length between the inner surface and the outer surface may be substantially constant in each radial direction from the signal electrode. The ground electrode and the substrate may at least substantially enclose the signal electrode.

According to some possible implementations, an optical modulator may include a substrate. The optical modulator may include one or more waveguides formed upon or in the substrate. The optical modulator may include a signal electrode including a curved outer surface. The optical modulator may include a ground electrode including a curved inner surface that curves toward the signal electrode. The ground electrode and the substrate may form an enclosure for the signal electrode.

BRIEF DESCRIPTION OF THE DRAWINGS

FIGS. 3A-3E are diagrams of cross sections and top views of another example implementation of a ground-enclosure modulator.

DETAILED DESCRIPTION

The following detailed description of example implementations refers to the accompanying drawings. The same reference numbers in different drawings may identify the same or similar elements.

In telecommunications, modulation is used to convey a message signal (e.g., a digital bit stream or an analog audio signal) inside another signal (e.g., a carrier signal, such as a radio signal, an electrical signal, an optical signal, etc.) that can be physically transmitted to a destination. A modulator is used to modulate (i.e., add information to) the carrier signal by varying one or more properties of the carrier signal using a modulation signal.

Figure 1:
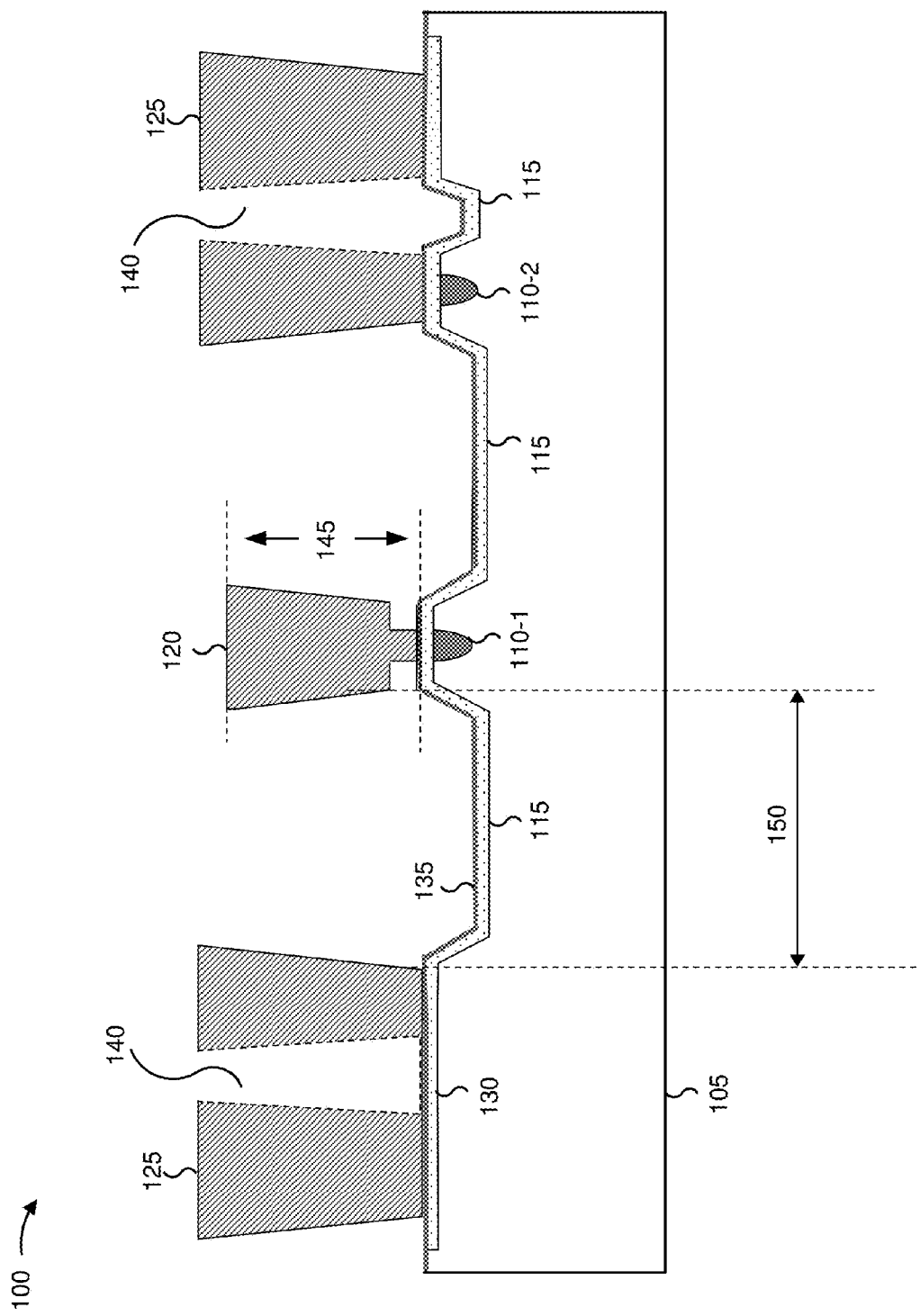
FIG. 1 is a diagram of an example implementation of a modulator that is coplanar with an optical waveguide.

In optical communications, an electrical signal carrying information is converted into an optical signal (e.g., for long-haul transmission or for another purpose) using an optical modulator (e.g., a 40 gigabit modulator, a 100 gigabit modulator, etc.). One common type of modulator for optical applications uses an electro-optically active substrate (e.g., lithium niobate, indium phosphide, gallium arsenide, etc.) with an optical waveguide formed axially along the substrate. A signal electrode is situated along the waveguide, and the signal electrode provides the modulation signal based on the electrical signal to modulate an optical signal carried by the waveguide. One or more ground electrodes may be situated parallel to the signal electrode to control radio frequency (RF) effects on the optical signal and to ground the signal electrode. An example of a cross section of such a modulator is shown in FIG. 1.

To improve modulation performance, a party may improve (e.g., reduce, minimize) RF loss along the signal electrode, and may match a propagation index of the electrical signal in the signal electrode with a propagation index of the optical signal in the waveguide, which reduces mismatch in velocity along the waveguide or signal electrode and improves accuracy and efficiency of the modulation. However, electrical charge may tend to congregate in some parts of the signal electrode more than other parts. This may introduce unwanted RF effects and may increase the voltage required to drive the modulator or may reduce the bandwidth of the modulation. Further, for some types of modulators, inner surfaces of the ground electrodes facing the signal electrode may not be approximately equidistant from an outer surface of the signal electrode, which further distorts the RF fields generated by the signal electrode.

Implementations described herein provide a ground-enclosure modulator with a signal electrode that is substantially or completely enclosed by a ground electrode, which improves distribution of charges in the signal electrode and thus reduces RF loss. Furthermore, in some cases, the ground electrode may be designed to have a substantially constant distance or radial gap between an outer surface of the signal electrode and the surrounding ground electrode surface in each radial direction from the outer surface of the signal electrode, which further improves RF performance.

Still further, in some cases, implementations described herein may be fabricated using well-known lithographic-growth-on-substrate methods, which simplifies implementation and reduces cost of the ground-enclosure modulator.

FIG. 1 is a diagram of a cross section of an example implementation of a modulator 100 that is coplanar with an optical waveguide. That is, modulator 100 includes a ground electrode that does not partially or completely enclose a signal electrode of modulator 100. FIG. 1 shows a cross section of modulator 100 in a cutting plane orthogonal to the longitudinal axis of modulator 100. Assume that modulator 100 is approximately uniform along the longitudinal axis.

As shown in FIG. 1, modulator 100 may include substrate 105. Substrate 105 includes an electro-optically active material, such as lithium niobate, indium phosphide, gallium arsenide, silicon, or the like. As shown, waveguides 110-1 and 110-2 may be situated axially parallel to substrate 105. Waveguide 110 includes an optical waveguide, such as an optical fiber, a channel waveguide, a ridge waveguide, or the like. Waveguide 110 may be formed upon or within substrate 105 using proton exchange, reactive ion etching, titanium indiffusion, ion beam implantation, or the like. Here, two optical waveguides 110 are shown (e.g., waveguides 110-1 and 110-2). By including waveguide 110-1 in association with signal electrode 120 and waveguide 110-2 in association with ground electrode 125, modulator 100 may improve modulation efficiency by, for example, ten to fifteen percent relative to the design without waveguide 110-2 under ground electrode 125.

As shown, substrate 105 may include substrate slots 115 (shown here as depressions in a surface of substrate 105 in the areas between signal electrode 120 and ground electrodes 125, and as a depression in the surface of substrate 105 in a location of stress slot 140 adjacent to waveguide 110-2). Substrate slots 115 improve modulation performance of modulator 100 by focusing RF signals from signal electrode 120 to waveguide 110-1 and/or waveguide 110-2.

As shown, signal electrode 120 may be situated adjacent to and/or axially parallel to waveguide 110-1. Signal electrode 120 includes a conductive material, such as copper, gold, or the like. Signal electrode 120 carries a modulation signal and generates an RF field based on the modulation signal. Here, signal electrode 120 and ground electrodes 125 are shown with outwardly sloping sides, which may be associated with the lithographic and electroplating process used to fabricate signal electrode 120 and ground electrodes 125. In a situation where signal electrode 120 and ground electrodes 125 are fabricated using another method, signal electrode 120 and ground electrodes 125 may not include outwardly sloping sides.

As shown, signal electrode 120 includes a square base with a narrower cross section (e.g., narrower than a top part of signal electrode 120) situated near waveguide 110-1. The narrower cross section of the base may improve modulation efficiency of signal electrode 120 by focusing RF fields generated by signal electrode 120 on waveguide 110-1.

As shown, ground electrodes 125 may be situated parallel to signal electrode 120 and/or waveguide 110-2. Ground electrode 125 includes a conductive material, such as copper, gold, or the like. Ground electrode 125 may ground RF fields generated by signal electrode 120, which improves modulation performance of modulator 100 by reducing RF interference. As further shown, signal electrode 120 and ground electrodes 125 may be mounted to buffer layer 130 and/or bleed layer 135. Buffer layer 130 includes a substance that electrically decouples signal electrode 120 and ground electrode 125 from substrate 105 (e.g., silicon dioxide or another dielectric material) at RF frequencies, while allowing minute leakage current to flow at DC. Bleed layer 135 includes one or more materials that mitigate pyroelectric effects from substrate 105 (e.g., titanium silicon nitride, or the like). As shown, ground electrodes 125 may include stress reduction slots 140. Stress reduction slots 140 are gaps in ground electrode 125, and may mitigate stress caused by thermal expansion of substrate 105, ground electrode 125, waveguides 110 and/or placement of signal electrode 120.

By increasing a height of signal electrode 120 (i.e., height 145) and/or a clearance between signal electrode 120 and ground electrode 125 (i.e., gap 150), RF performance of modulator 100 can be improved by causing RF currents to be more spread out across the perimeter of the RF electrodes. However, increasing height 145 and/or gap 150 requires increased drive voltage to achieve a particular modulation depth. Furthermore, as height 145 increases, fabrication of signal electrode 120 becomes increasingly difficult. Still further, when ground electrode 125 does not partially or completely enclose signal electrode 120, electrical charge may tend to congregate at a bottom of signal electrode 120 (i.e., near waveguide 110) which reduces efficiency of signal electrode 120 by increasing RF skin-effect loss.

As indicated above, FIG. 1 is provided merely as an example. Other examples are possible and may differ from what was described with regard to FIG. 1.

Figure 2A:
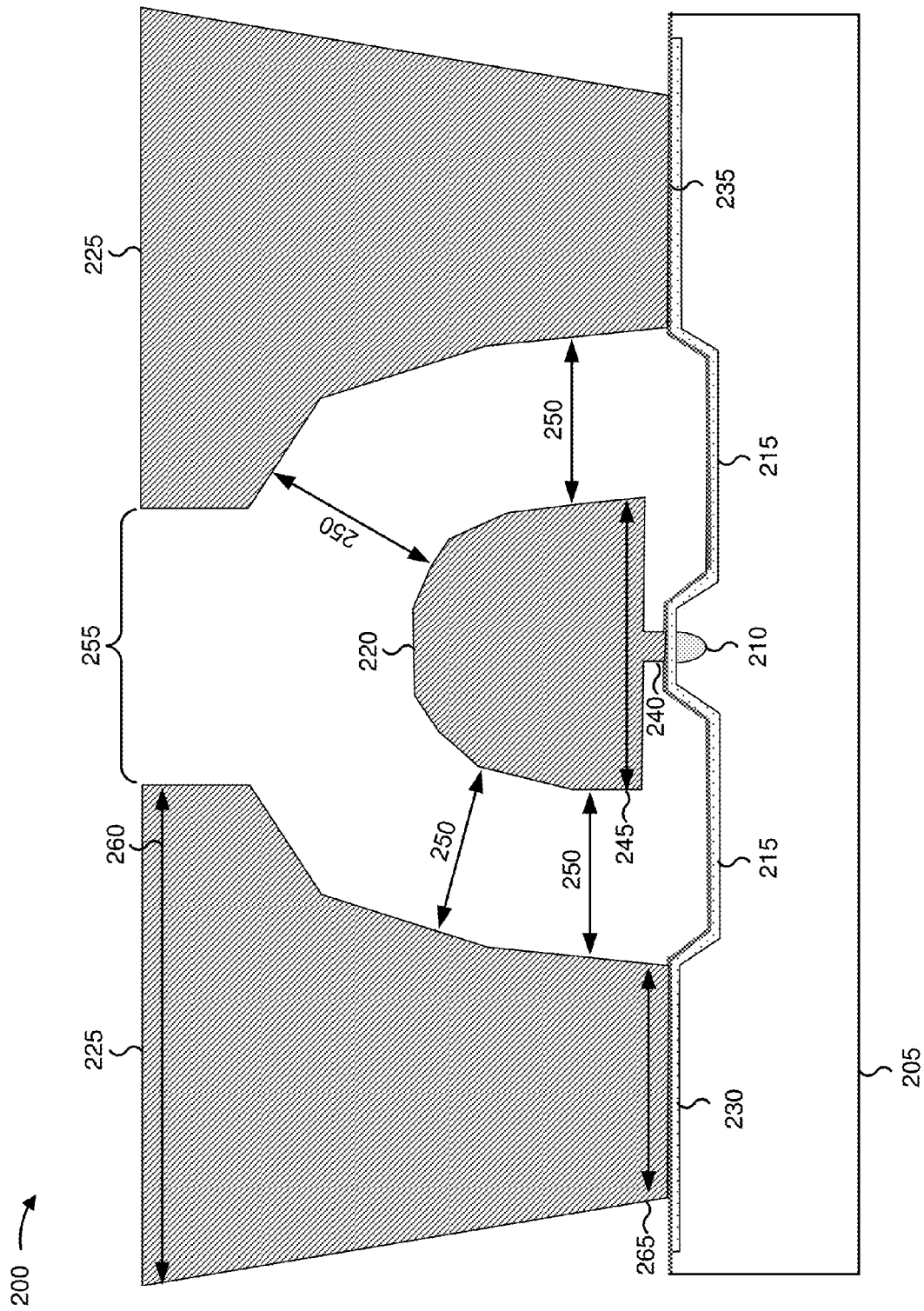
FIGS. 2A and 2B are diagrams of cross sections of an example implementation of a ground-enclosure modulator.
Figure 2B:
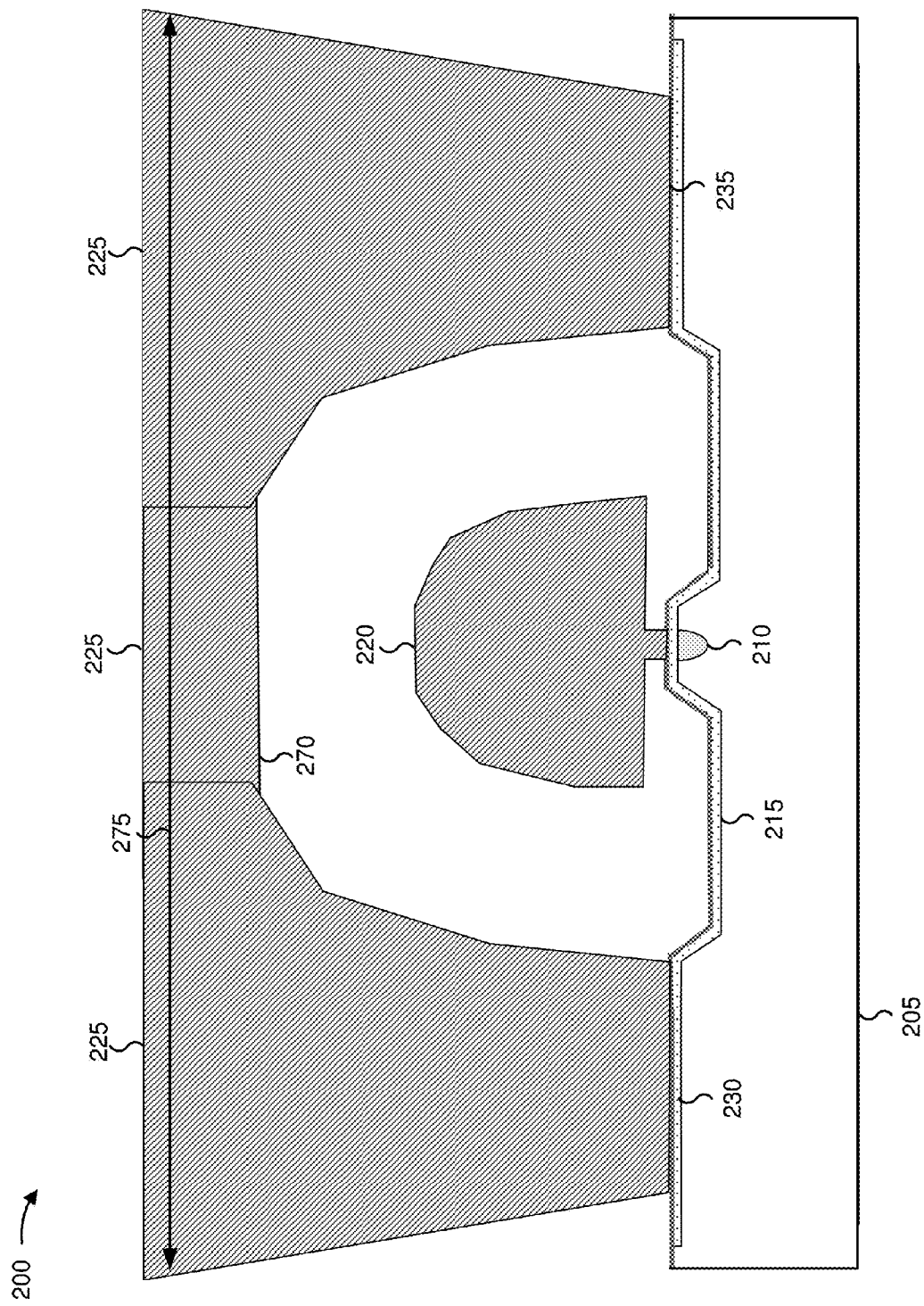

FIGS. 2A and 2B are diagrams of cross sections of an example implementation of a ground-enclosure modulator 200. As shown, ground-enclosure modulator 200 includes substrate 205, waveguide 210, substrate slot 215, signal electrode 220, ground electrode 225, buffer layer 230, and bleed layer 235. Substrate 205, waveguide 210, substrate slot 215, signal electrode 220, ground electrode 225, buffer layer 230, and bleed layer 235 may be fabricated using the materials described with regard to the corresponding components of modulator 100 using any reasonable fabrication method known in the art. In particular, the rounded shape of electrodes 220 and 225 can be approximated as a staircase shape created by multiple lithographic and electroplating steps performed one after the other. In some implementations, ground-enclosure modulator 200 may include two waveguides 210, as described in more detail in connection with waveguides 110-1 and 110-2 in FIG. 1, which may improve modulation efficiency of ground-enclosure modulator 200.

As shown in FIG. 2A, signal electrode 220 may have a curved outer surface, which improves distribution of charge on a surface of signal electrode 220 and which reduces RF loss associated with charge clustering. In some implementations, signal electrode 220 may be cylindrical, semi-cylindrical, or the like. A cylindrical signal electrode 220 may further reduce RF loss and improve modulation efficiency of ground-enclosure modulator 200, whereas a semi-cylindrical signal electrode 220 may be simpler to fabricate than a cylindrical signal electrode 220. In some implementations, signal electrode 220 may have a different cross-sectional shape than what is shown in FIG. 2A, such as a shape that tapers to a decreased width as a distance from waveguide 210 increases, a rectangle, a triangle, a trapezoid, or the like. In some implementations, signal electrode 220 and ground electrode 225 take on shapes to reduce the number of acute corners, maintain a substantially consistent gap between signal electrode 220 and ground electrode 225 and substantially or partially enclose the signal electrode 220 with ground electrode 225.

In some implementations, signal electrode 220 may have a width at a base 240 of signal electrode 220 (i.e., the portion of signal electrode 220 that is adjacent to waveguide 210) of approximately 7 microns or in a range from approximately 5 to 10 microns (e.g., 6 microns, 9 microns, etc.). In some implementations, signal electrode 220 may have a height at base 240 of approximately 10 microns or in a range from approximately 2 to 15 microns (e.g., 5 microns, 10 microns, etc.). In some implementations, signal electrode 220 may have a width, at cross section 245, of approximately 30 microns or in a range from approximately 10 to 50 microns (e.g., 20 microns, 40 microns, etc.). In some implementations, signal electrode 220 may have a height (e.g., from base 240 to a top of signal electrode 220) of approximately 50 microns or in a range from approximately 10 to 100 microns (e.g., 30 microns, 60 microns, etc.).

As further shown in FIG. 2A, ground electrode 225 partially encloses signal electrode 220. Furthermore, the inner surface of ground electrode 225 (i.e., the surface facing the outer surface of signal electrode 220) may be fabricated with an inward slope or may curve toward signal electrode 220. In this way, consistency of the gap length between the curved outer surface of signal electrode 220 and a curved inner surface of ground electrode 225 (i.e., gap 150 in FIG. 1) is improved. For example, each of the gap lengths in the radial direction, shown by reference number 250, are approximately equal, which reduces RF loss due to charge clustering and improves modulation efficiency of ground-enclosure modulator 200. In some implementations, gap length 250 may be approximately 50 microns or in a range from approximately 20 to 100 microns (e.g., 30 microns, 70 microns, etc.). In some implementations, ground-enclosure electrode 200 may include a material or substance that partially or completely fills the gap between signal electrode 220 and ground electrode 225, such as air, nitrogen, argon, benzoclyobutene, photoresist, or another polymer or gas. In some implementations, the gap between signal electrode 220 and ground electrode 225 may be a vacuum.

As shown by reference number 255, ground-enclosure modulator 200 includes an opening, referred to herein as an electrode gap, which may simplify fabrication of ground-enclosure modulator 200 (e.g., by permitting removal of a photoresist in a lithographic process, by requiring fewer lithographic placement steps in a lithographic process, etc.). In some implementations, electrode gap 255 may have a width of approximately 20 microns or in a range from approximately 10 to 50 microns (e.g., 15 microns, 30 microns, etc.) and/or a cross-sectional area of approximately 200 square microns or in a range from approximately 100 to 500 square microns (e.g., 150 square microns, 300 square microns, etc.). In some implementations, when ground electrode 225 includes electrode gap 255, a top surface of ground electrode 225 may have a width 260 of approximately 100 microns or in a range from approximately 50 to 200 microns (e.g., 75 microns, 150 microns, etc.), or may have a width 260 that is 200% of, or in a range from approximately 150% to 300% of, a width 265 of a base of ground electrode 225. Width 265 may be approximately 50 microns or in a range from approximately 25 to 100 microns (e.g., 40 microns, 80 microns, etc.). In some implementations, ground electrode 225 may have a height of approximately 60 microns or in a range from approximately 30 to 100 microns (e.g., 50 microns, 75 microns, etc.).

As shown in FIG. 2B, and by reference number 270, in some implementations, signal electrode 220 is completely enclosed by ground electrode 225, which may reduce RF loss and improve modulation efficiency of signal electrode 220. In some implementations, at different cross sections of ground-enclosure modulator 200, ground electrode 225 may completely enclose signal electrode 220, as in FIG. 2B, and at other cross sections of ground-enclosure modulator 200, ground electrode 225 may partially enclose signal electrode 220, as in FIG. 2A. This may provide some of, or all of, the benefits described in connection with reference number 250 of FIG. 2B, while simplifying fabrication of ground-enclosure modulator 200. The repetition or length of gaps 255 may be periodic or irregular.

In some implementations, when ground electrode 225 completely encloses signal electrode 220, ground electrode 225 may have a width 275, at a top surface of ground electrode 225, of approximately 220 microns or in a range from approximately 100 to 500 microns (e.g., 200 microns, 250 microns, etc.) and/or approximately 300% or in a range from approximately 200% to 500% of width 265 at a base of ground electrode 225, as shown in FIG. 2A. In some implementations, ground electrode 225, along with substrate 205, may at least substantially enclose (e.g., 75%, 80%, 95%, 100%) an outer surface of signal electrode 220 along a longitudinal axis of ground-enclosure modulator 200. For example, an inner surface of ground electrode 225 may include electrode gap 255 which causes the outer surface of signal electrode 220 to be less than fully enclosed along the longitudinal axis of ground-enclosure modulator 200. In some implementations, a ratio of a surface area of the curved inner surface with electrode gap 255 to a surface area of the curved inner surface without electrode gap 255 may be approximately 75%, 80%, 95%, 100%, or the like.

As indicated above, FIGS. 2A and 2B are provided merely as examples. Other examples are possible and may differ from what was described with regard to FIGS. 2A and 2B.

Figure 3B:
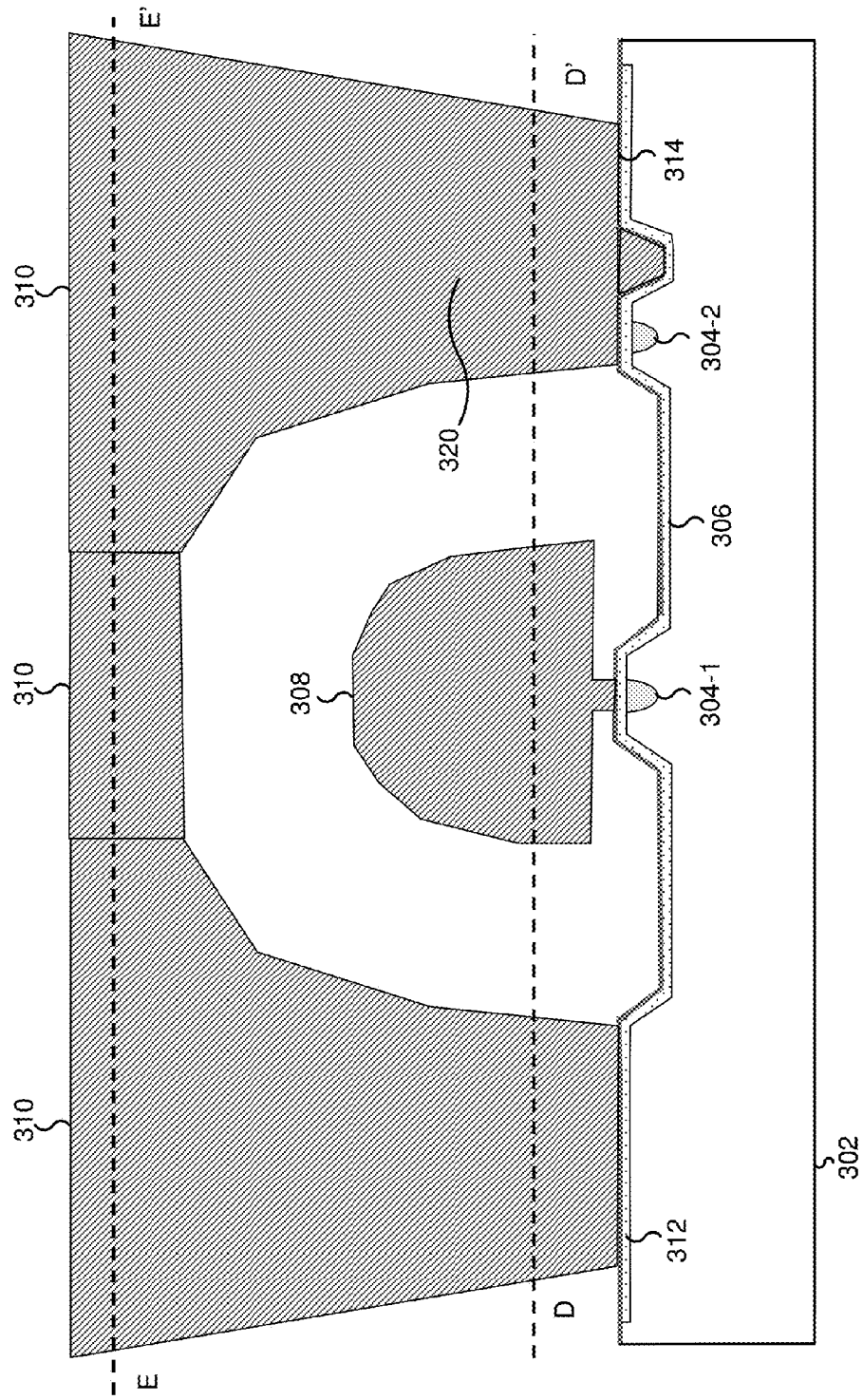
Figure 3C:
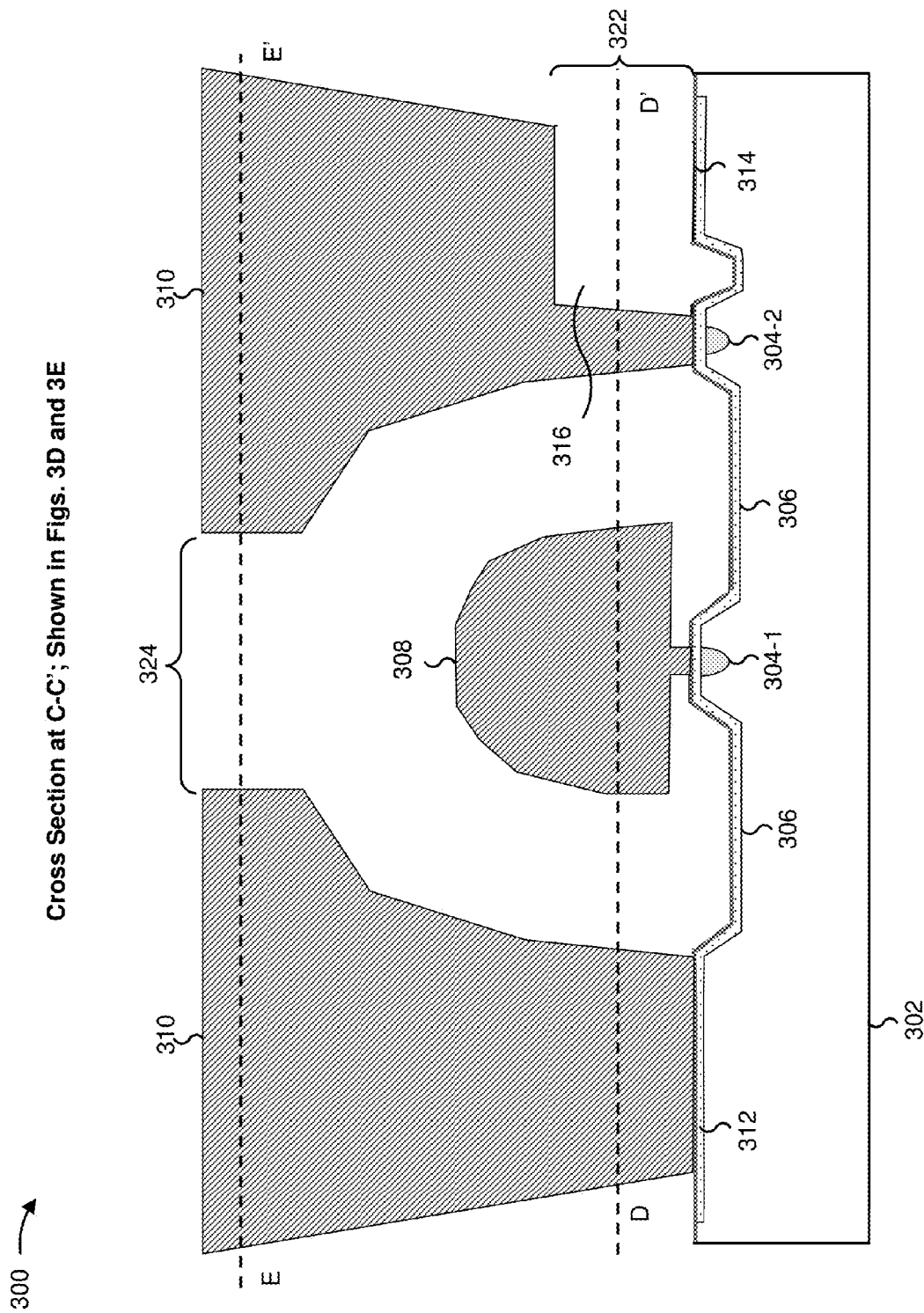
Figure 3D:
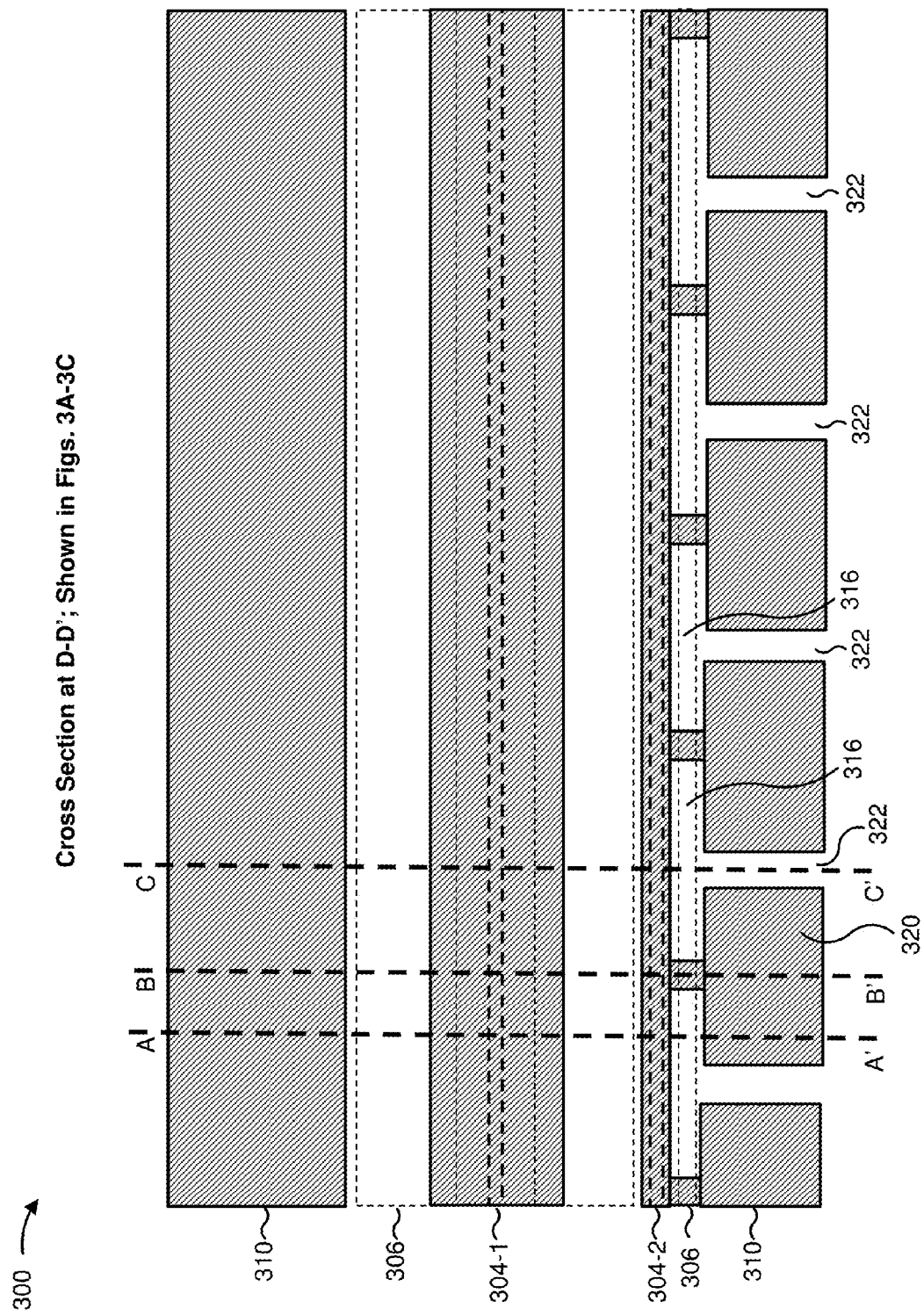
Figure 3E:
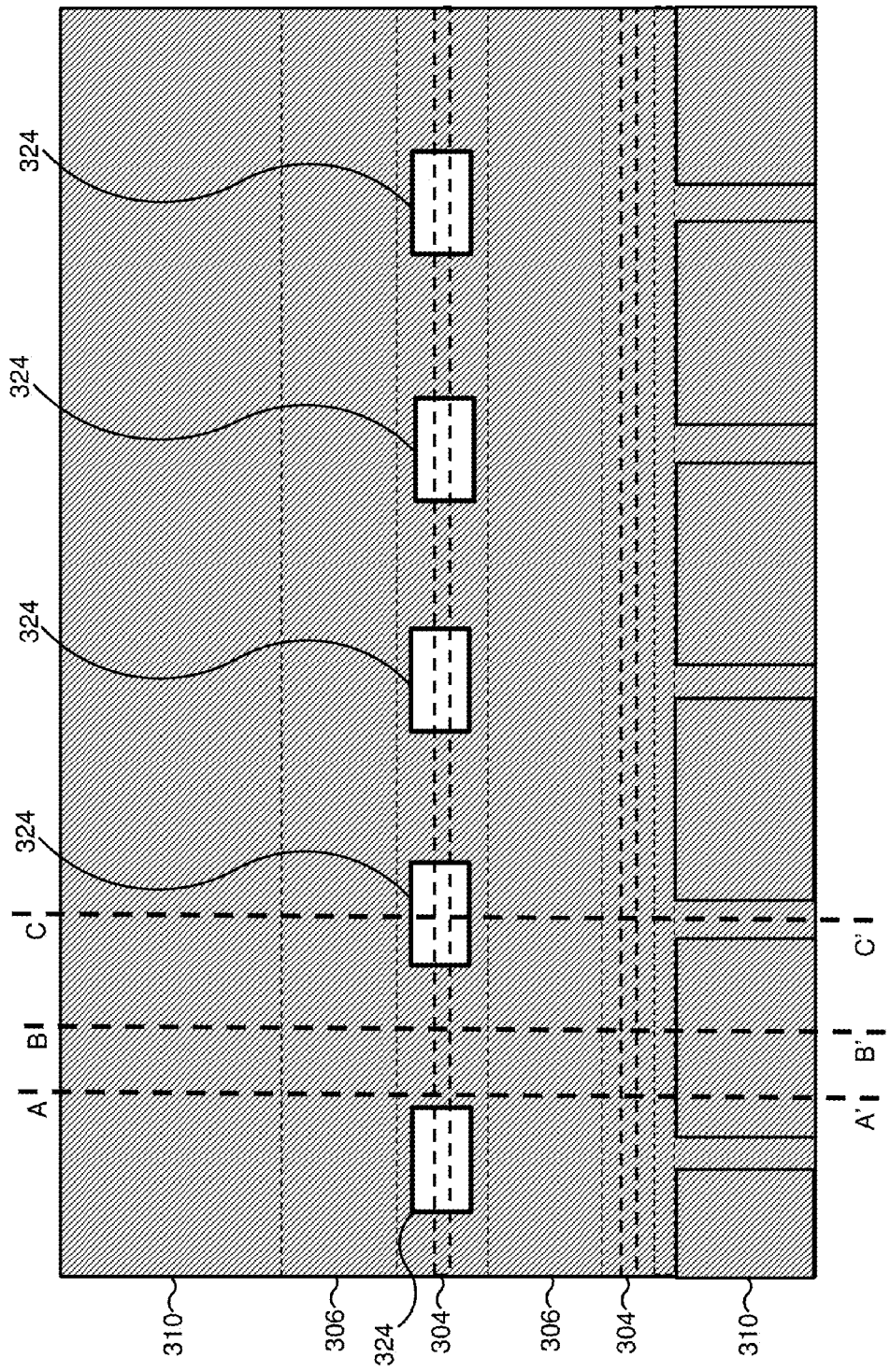

FIGS. 3A-3C are diagrams of cross sections of another example implementation of a ground-enclosure modulator 300. FIGS. 3D and 3E are top view diagrams of cross sections of the example implementation of ground-enclosure modulator 300 shown by FIGS. 3A-3C. As shown, ground-enclosure modulator 300 includes substrate 302, waveguides 304-1 and 304-2, substrate slot 306, signal electrode 308, ground electrode 310, buffer layer 312, and bleed layer 314. Substrate 302, waveguides 304-1 and 304-2, substrate slot 306, signal electrode 308, ground electrode 310, buffer layer 312, and bleed layer 314 may be fabricated using the materials described with regard to the corresponding components of modulator 100 and/or ground-enclosure modulator 200 using any reasonable fabrication method known in the art, such as multiple lithographic and electroplating steps, epitaxial placement, or the like. Waveguides 304-1 and 304-2 improve modulation efficiency as compared to a modulator with a single waveguide 304.

FIGS. 3A-3C show cross sections A-A', B-B', and C-C', respectively. Cross sections A-A', B-B', and C-C' include cutting planes orthogonal to the longitudinal axis of ground-enclosure modulator 300, and lines identifying the cutting planes corresponding to cross sections A-A', B-B', and C-C' are shown in FIGS. 3D and 3E. FIGS. 3D and 3E show cross sections D-D' and E-E', respectively, which include cutting planes parallel to a surface of substrate 302. Lines identifying the cutting planes corresponding to cross sections D-D' and E-E' are shown in FIGS. 3A-3C.

As shown in FIG. 3A, at cross section A-A', signal electrode 308 is completely enclosed by ground electrode 310 and substrate 302, which reduces RF loss and improves modulation efficiency of ground-enclosure modulator 300. As further shown, ground-enclosure modulator 300 includes buried slot 316. Buried slot 316 is a gap in ground electrode 310 to mitigate stress caused by thermal expansion due to increase in ambient temperature of waveguides 304-1 and 304-2, signal electrode 308, and/or ground electrodes 310. Here, buried slot 316 does not continue through ground-enclosure modulator 300 to upper surface 318, which reduces RF loss as compared to a stress slot that continues to upper surface 318. In some implementations, buried slot 316 may continue to upper surface 318, which simplifies fabrication of ground-enclosure modulator 300 by eliminating the need for slot opening 322, as shown in FIG. 3C.

FIG. 3B is a diagram of ground-enclosure modulator 300 at cross section B-B', shown in FIGS. 3D and 3E. As shown in FIG. 3B, and by reference number 320, at cross section B-B', buried slot 316 may not be included in ground electrode 310, or may be filled, which improves structural resilience of ground-enclosure modulator 300, and which reduces RF loss associated with buried slot 316. In some implementations, buried slot 316 may be filled at multiple, different locations in ground-enclosure modulator 300, as will be described in more detail in connection with FIG. 3D.

FIG. 3C is a diagram of ground-enclosure modulator 300 at cross section C-C', shown in FIGS. 3D and 3E. As shown in FIG. 3C, at cross section C-C', buried slot 316 may include a slot opening 322. Slot opening 322 is a gap from buried slot 316 to an exterior surface of ground electrode 310 to permit removal of a photoresist in a situation where ground-enclosure modulator 300 is fabricated using a lithographic growth process, thereby simplifying fabrication of ground-enclosure modulator 300. As shown by reference number 324, at cross section C-C', ground electrode 310 may include an electrode gap 324. Electrode gap 324 is a gap in ground electrode 310 that permits access to signal electrode 308 and/or removal of a photoresist for a lithographic growth process, thereby simplifying fabrication of ground-enclosure modulator 300.

FIG. 3D is a top view diagram of ground-enclosure modulator 300 at cross section D-D', shown in FIGS. 3A-3C. As shown in FIG. 3D, waveguides 304-1 and 304-2 are shown by thickly-dashed lines, and substrate slots 306 are shown by thinly-dashed lines. As further shown, cross section A-A' includes buried slot 316. As shown by reference number 320, at cross section B-B', buried slot 316 is filled, thereby increasing structural resilience of ground-enclosure modulator 300.

As shown by reference number 322, at cross section C-C', slot opening 322 permits removal of a photoresist when fabricating ground-enclosure modulator 300, thereby simplifying fabrication of ground-enclosure modulator 300. As further shown, slot openings 322 and filled buried slots 316 continue along ground-enclosure modulator 300 at periodically spaced locations. However, the locations of slot openings 322 and filled buried slots 316 need not be periodically spaced, and may be placed at any arbitrary spacing. Additionally, or alternatively, ground-enclosure modulator 300 may not include buried slots 316. For example, in a situation where ground-enclosure modulator 300 includes a single waveguide 304 (e.g., waveguide 304-1), ground-enclosure modulator 300 may not include buried slots 316, which simplifies fabrication of ground-enclosure modulator 300 and reduces RF loss.

FIG. 3E is a top view diagram of ground-enclosure modulator 300 at cross section E-E', shown in FIGS. 3A-3C. As shown in FIG. 3E, ground electrode 310, in conjunction with substrate 302 (not shown) may completely enclose signal electrode 308, with the exception of electrode gaps 324. Electrode gap 324 is described in connection with cross section C-C', shown in FIG. 3C. As further shown, electrode gaps 324 are placed at periodically spaced locations along ground electrode 310, which permits removal of a photoresist and/or a metal seed layer during a lithographic growth process. However, electrode gaps 324 need not be at periodically spaced locations, and may be placed at any arbitrary location on ground-enclosure modulator 300. In some implementations, ground electrode 310 may not include electrode gaps 324 (e.g., when ground electrode 310 is fabricated using a process that does not require removal of a photoresist, seed metal, or the like), which may reduce RF loss and thereby improve modulation efficiency.

The curved geometry of surfaces of electrodes 220, 225, 308, and 310 shown in FIGS. 2A, 2B, and 3A-3E may be fabricated, for example, by multiple rounds of photolithography and electroplating, where openings are patterned in a layer of photoresist, then gold or copper electrodes are plated up through the openings. The openings for the signal electrode 220/308 may be smaller and smaller with each successive lithographic step, while the openings for the ground electrode 225/310 may be larger and larger. It may be necessary to hard bake the photoresist at some of the lithographic steps, to keep the photoresist from being patterned and removed by subsequent lithographic steps. The last electroplating step may allow metal for ground electrode 225/310 to plate horizontally as well as vertically, to allow the left and right ground electrodes 225/310 to become connected at the top. The photoresist left temporarily underneath the ground electrodes 225/310 would allow the ground electrodes 225/310 on each side of the signal electrode 220/308 to merge above the signal electrode 220/308, while maintaining a defined RF gap. After all lithographic steps are complete, the photoresist is removed by solvents entering the slots at the top and side of ground electrodes 225/310 (e.g., at slot opening 322 and electrode gap 324). Seed layer metals needed for electroplating are removed by etchants entering the same slots.

In this way, a ground-enclosure modulator substantially or completely encloses a signal electrode in a ground electrode, thereby reducing RF loss and improving modulation efficiency, while using a lower drive voltage than a modulator that is coplanar with an associated waveguide.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A modulator, comprising:
   a substrate;
   one or more waveguides formed upon or formed in the substrate;
   a signal electrode provided adjacent to at least one of the one or more waveguides and including a curved outer surface; and
   one or more ground electrodes provided adjacent to the signal electrode,
      each ground electrode, of the one or more ground electrodes, including a respective curved inner surface that is radially spaced from the curved outer surface of the signal electrode, and
      the one or more ground electrodes at least partially overlapping a portion of a width of the signal electrode.

2. The modulator of claim 1, where the one or more ground electrodes comprise a first ground electrode and a second ground electrode,
   a gap existing between the first ground electrode and the second ground electrode.

3. The modulator of claim 2, where a plurality of gaps are spaced along a longitudinal axis of the modulator,
   the plurality of gaps including the gap.

4. The modulator of claim 1, where the one or more waveguides include a first waveguide and a second waveguide,
   the first waveguide being adjacent to the signal electrode, and
   the second waveguide being adjacent to one of the one or more ground electrodes.

5. The modulator of claim 4, further comprising a gap in the one or more ground electrodes,
   the gap being formed adjacent to the second waveguide.

6. The modulator of claim 1, where the one or more ground electrodes and the substrate at least substantially enclose the curved outer surface of the signal electrode along a longitudinal axis of the modulator.

7. The modulator of claim 1, where the one or more ground electrodes comprise a first ground electrode, a second ground electrode, and a third ground electrode,
   the first ground electrode and the second ground electrode being formed upon the substrate, and
   the third ground electrode being formed in between the first ground electrode and the second ground electrode, and
   the third ground electrode being formed above the signal electrode.

8. The modulator of claim 1, where each respective curved inner surface comprises a plurality of surfaces.

9. The modulator of claim 1, where the curved outer surface comprises a plurality of surfaces.

10. An optical modulator, comprising:
    a substrate;
    one or more waveguides formed upon or in the substrate;
    a signal electrode including a curved outer surface; and
    a ground electrode including a curved inner surface that curves toward the signal electrode,
       the ground electrode at least partially overlapping a portion of a width of the signal electrode and extending above the signal electrode in a direction perpendicular to the width of the signal electrode and along a length of the signal electrode.

11. The optical modulator of claim 10, further comprising:
    a plurality of openings in an enclosure formed by the ground electrode and the substrate,
       the plurality of openings being spaced longitudinally along an outer surface of the ground electrode.

12. The optical modulator of claim 11, where the plurality of openings are spaced evenly along the outer surface of the ground electrode.

13. The optical modulator of claim 10, where the one or more waveguides comprise:
    a first waveguide located adjacent to the signal electrode; and
    a second waveguide located adjacent to the ground electrode.

14. The optical modulator of claim 13, where the second waveguide is adjacent to a gap in the ground electrode,
    the gap continuing longitudinally along an enclosure formed by the ground electrode and the substrate.

15. The optical modulator of claim 14, where the enclosure further comprises one or more openings from the gap to an outer surface of the ground electrode.

16. The modulator of claim 10, where the curved inner surface comprises a plurality of surfaces.

17. The modulator of claim 10, where the curved outer surface comprises a plurality of surfaces.

* * * * *